United States Patent

[11] 3,596,083

| [72] | Inventor | Howard B. Lovering<br>Bedford, Mass. |
|---|---|---|
| [21] | Appl. No. | 815,470 |
| [22] | Filed | Apr. 11, 1969 |
| [45] | Patented | July 27, 1971 |
| [73] | Assignee | G. C. A. Corporation<br>Bedford, Mass. |

[54] APPARATUS FOR PRODUCING A UNIFORM LIGHT FIELD
6 Claims, 4 Drawing Figs.

[52] U.S. Cl. .................................................. 240/41 R,
240/1 EI, 350/96 B
[51] Int. Cl. ..................................................... G02b 5/16,
F21m 7/00
[50] Field of Search ............................................ 240/1, 1.4,
1 EI, 41, 41.1; 350/96, 314

[56] References Cited
UNITED STATES PATENTS

| 1,900,966 | 3/1933 | Wolfe | 350/314 X |
| 2,979,601 | 4/1961 | McClees | 350/314 X |
| 3,131,690 | 5/1964 | Innis et al. | 240/1 (E.I.) |
| 3,217,594 | 11/1965 | Simmon | 350/96 (B) X |
| 3,244,894 | 5/1966 | Steele et al. | 350/96 (B) X |
| 3,312,143 | 4/1967 | Karow et al. | 350/314 X |
| 3,331,956 | 7/1967 | Hough et al. | 240/1 (E.I.) X |

FOREIGN PATENTS

| 964,567 | 7/1964 | Great Britain | 240/1 (E.I.) |

Primary Examiner—Joseph F. Peters, Jr.
Attorney—Kenway, Jenney and Hildreth

ABSTRACT: A projector for microreduction photographic apparatus in which light from an arc discharge source is collimated and filtered to pass only wavelengths to which photosensitive material is responsive and then focused upon the entrance face of a fiber optics bundle, the entrance face being contoured to match the configuration of the focused image. The fiber bundle has an exit face circular in cross section and the fibers are randomly dispersed so that fibers in any given area of the entrance face are dispersed throughout the total area of the circular exit face in order to provide a uniform light field, a condenser lens system directs the rays emitted from the exit face of the bundle uniformly upon the entrance pupil of a projection lens; thus the radiation from the nearly rectangular arc discharge is transformed at maximum efficiency into a uniform, collimated, narrow band source for the projection lens.

PATENTED JUL 27 1971  3,596,083

INVENTOR.
HOWARD B. LOVERING
BY
Kenway, Jenney & Hildreth
ATTORNEYS

APPARATUS FOR PRODUCING A UNIFORM LIGHT FIELD

BACKGROUND OF THE INVENTION

In recent years the technology of computers and space vehicles has demanded exquisitely precise devices of exceptionally small dimensions. One technique involves the photographic reduction of large scale drawings, models, or transparencies, to miniature patterns or images upon photographic emulsions or photo resist materials.

While the photographic microreduction technique has been widely used for many years, the extreme precision (of the order of one-quarter of the wavelength of light) now required has raised a number of technical problems, not the least of which is imposed by the fact that known sources of light, such as mercury vapor arc tubes and Xenon flash lamps, do not emit light of uniform field intensity.

In microreduction systems of the types employed in forming patterns used, for example, in integrated circuit manufacture, it has become increasingly more difficult to properly illuminate the optical system, as the available objective lenses have increased in angular field coverage to utilize larger useful formats. In such a system, the image of the light source, as transferred by the condenser system, must fill the pupil of the objective lens in order that the full performance of which the objective lens is capable, can be realized. By pupil of the object lens is meant the imaginary opening toward which all of the light rays must be directed in order to be transmitted to the final image plane of the entire system. By image plane is meant the plane at which the objective lens of the microreduction optical system focuses an image of the transparency being used.

Furthermore, the illumination of the image plane, that is, the plane at which the final image is to be projected on the photoresist is placed, must be uniform throughout its area to a very critical degree as dictated by the gamma of the high-contrast, high-resolution, photographic emulsions in general use for the above purposes. These emulsions are characterized by a very large change in the density of the developed image for a relatively small change in incident light energy during exposure. So also, a similar critical uniformity of illumination is required in microreduction processes using photopolymer materials because of the very high sensitivity of such materials to small changes of incident light. A photopolymer is an organic resin that is or has been made sensitive to light so that portions exposed to light will react differently to organic solvents than to portions not exposed.

As an example of the high-contrast, high-resolution, photographic emulsions mentioned above is one manufactured by Eastman Kodak Company as Type 649 GH. An example of the photopolymers mentioned above as Type AZ-1350 Photo-Resist, manufactured by Shipley Company, Inc. of Newton, Massachusetts.

In microreduction systems, it is highly advantageous to use a high-intensity light source to minimize exposure times, and light sources to whose wavelength the emulsions or photoresists are most sensitive. Two are commonly used, one being a mercury arc lamp and the other a Xenon flash lamp. Such lamps are well known to persons skilled in the art. However, the characteristics of the energy distribution of light emitted by these lamps present several problems as follows:

First of all, the arc or discharge paths of the lamps are generally longer than their effective width. If these elongated discharge paths are focused on the pupil of the objective lens (which is invariably a round aperture), the elongated shape cannot fill the entire aperture if the whole of the source image is to be used. Thus, the aperture will not be uniformly illuminated.

Another problem is that such arc discharges do not radiate equally in all directions, relative to a normal to the discharge path. That is, if one projects the optical axis of the optical system back to the arc or discharge of the light source, and then measures the light energy at points lying unequal distances from the axis along a line perpendicular thereto, the light energies will be unequal.

Trouble also occurs in that the envelopes of such lamps are, of necessity, at some real physical distance from the arc and are generally not of optical quality in the sense that ground and polished lens surfaces are. The imperfections of these envelopes cause the light from the lamp discharges to be transferred nonuniformly to the image plane of the objective lens, thus causing nonuniformity of exposure of the photosensitive material.

A still further problem arises from the fact that the light sources used in microreduction optical systems generally create heat as well as light. Such heat may cause unwanted thermal expansions of the mechanical parts of the microreduction apparatus and of the transparency being used. This can create errors in the accuracy of the final image being projected on the photoresist material. Hence, it is desirable to locate the lamp remotely from those parts of the apparatus which would be adversely affected by heat.

OBJECTS OF THE INVENTION

An important object of the invention is to provide apparatus for producing a uniform light field from a nonuniform light source.

Another object of the invention is to eliminate errors arising from heat-engendered distortion of elements of the apparatus.

These and other objects of the invention will be readily appreciated from the following detailed description of a preferred embodiment thereof selected for purposes of illustration, and shown in the accompanying drawings, in which.

Similar reference characters indicate corresponding parts throughout the several views of the drawings and in the drawings, dimensions of certain of the parts as shown have been modified and/or exaggerated for the purposes of clarity of illustration and understanding of the invention.

Figure 1:
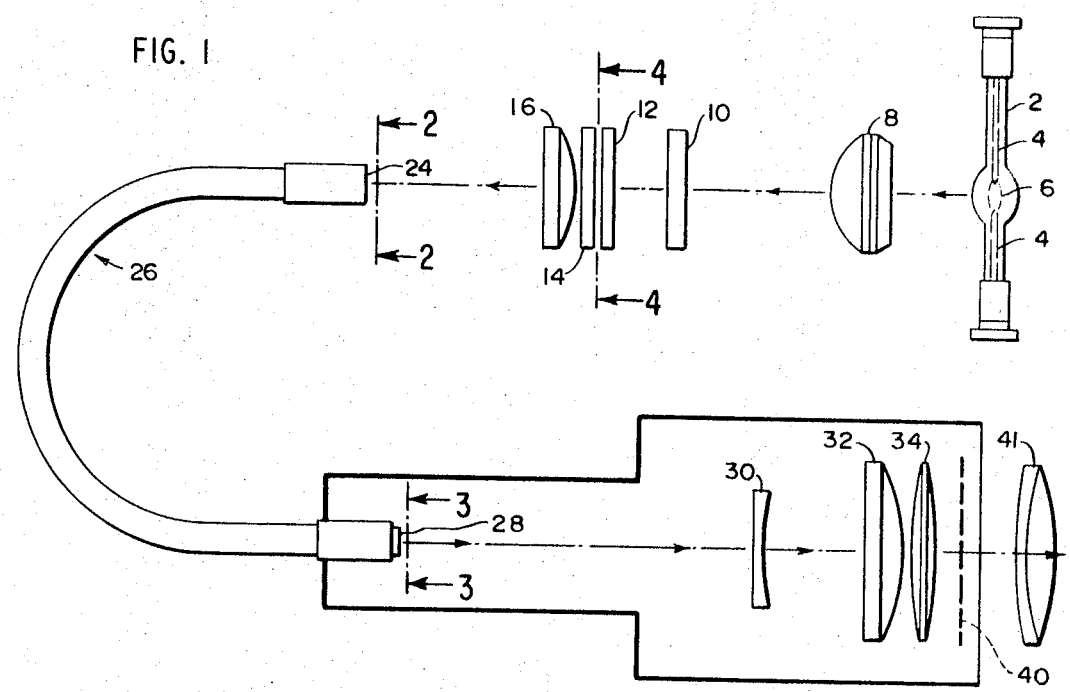
FIG. 1 is a schematic illustration of an optical system constructed in accordance with the invention.

Referring to FIG. 1 for a schematic layout of one embodiment of this invention, a source of illumination 2 is provided, such as a mercury arc lamp or a Xenon flash lamp. In either case, the lamp has electrodes 4—4 between which an arc discharge 6 occurs in conventional manner. Radiation from the arc is transmitted through a collimating system comprising a positive doublet 8 used to correct for spherical aberration, a heat absorbing filter 10, a wavelength filter 12, a balancing element 14, and the lens 16. The use of the wavelength filter will be determined, in accord with conventional practice, by the particular wavelength sensitivity of the emulsion or photopolymer being used. The heat filter 10 is conventional, and element 14 will be described below.

The condenser system 8—16 focuses an image 22 of the arc discharge on the entrance face 24 of a bundle of optically transparent fibers indicated generally by numeral 26. The bundle has an exit face 28.

A condensing lens system such as a conventional air-spaced triplet 30, 32 and 34 is used to project the image of the exit face 28 on the object plane 40 of an objective lens 41 (shown in dotted lines) which is used to focus the system on the photoresist in conventional manner. Thus, surface 28 becomes the radiating element for the condensing lens 30—34.

Figure 2:
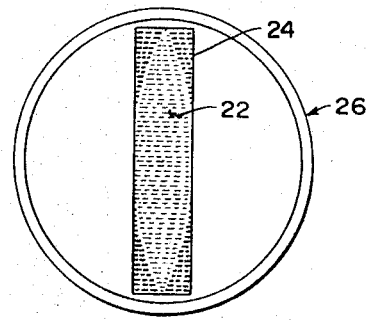
FIG. 2 is a view of a portion of the system of FIG. 1 taken in the direction of sight lines 2—2 thereon.
Figure 3:
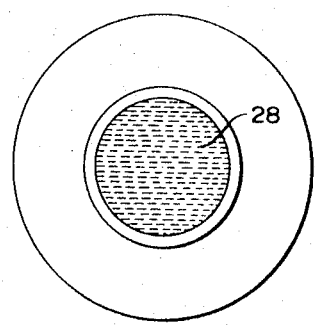
FIG. 3 is a view of a portion of the system of FIG. 1 taken in the direction of sight lines 3—3 thereon.

The ends of the fibers at the entrance surface 24 are oriented or stacked to form a rectangle (see FIG. 2) the envelope or boundary of which preferably is just large enough geometrically to circumscribe the image 22 of the arc discharge. At the exit end of the filter fiber bundle, the fibers are oriented to form a round face 28, the area of which is substantially the same as the area of rectangle 24.

At the faces 24 and 28 the fibers are fused together. In order to allow freedom of positioning the portions 12—16 in respect to other parts of the apparatus, it is preferred that between the fused ends, the fibers are not fused together, and thus the bundle will be flexible. Each fiber comprises a central core of glass having one index of refraction for the wavelength of light being used, and an outer sheath of glass having an index of refraction less than that of the core at the particular wavelength. As an example, the bundle 26 may be 18 inches to 20 inches long, and approximately three eighths of an inch in diameter. The individual fibers may have, as an example, a diameter of 0.0028 inches, with the index of refraction of the core being 1.62 and that of the sheath being 1.52. The face 24 may be, for example, 0.158 inches wide by 0.710 inches long, when used with a Xenon flash lamp Type FX-76 manufactured by EG&G, Inc., of Bedford, Massachusetts. With such an entrance face, the exit face 28 should be 0.374 inches in diameter. (The foregoing dimensions are approximate.)

At the entrance face 24 of the bundle, the fibers that make up the bundle are of course in a definite array. However, it is critical in this invention that the fibers at the entrance face 24 which have a given orientation with respect to each other are not in that same orientation at the exit face 28. Instead, the fibers are deliberately disarranged after leaving the entrance face 24 so that at the face 28 they are scattered from their face 24 orientation into a statistical lack of organization at the exit face. That is, the positions of fibers at the exit face 28 bear no correlation to the positions of the fibers at the entrance face 24.

Here it must be remembered that the object of the invention is to eliminate, at the exit face 28, any lack of uniformity in the illumination of the entrance face 24. To achieve that result, according to this invention, the fibers lying in any given area of the plane of the entrance face are dispersed, degrouped, or scattered so that their positions when they terminate at the exit face are fairly uniformly distributed throughout the total area of the exit face. Consider, by way of example, a relatively bright spot of small dimension at the entrance face, that spot may play upon, say, a cluster of 40 fiber ends. However, these fibers are so interwoven, dispersed, or scattered in the length of the body of fibers that when they terminate at the exit face, they are no longer a group but are integrated throughout the exit face area. Hence the bright spot has been dissipated. The same result is, of course, the fate of any area of uneven illumination at the entrance face.

As a result of this dispersion, degrouping, or scattering of the fibers of the bundle, combined with the minute size of the individual fiber in the much greater bundle, any nonuniformity of light at the image 22 is statistically averaged out uniformly across the entire exit face 28, thus providing the uniform illumination of the pupil of the projection lens 41 necessary for precise microreduction work. Thus, the imperfections of the lamp envelope, and the shape and nonuniform angular radiation of the lamp are prevented from having any effect on the performance on the system as a whole, and the circular pupil of the final projection lens is filled by the image of the circular end of the fiber bundle, thus fulfilling the requirements of the objective.

Figure 4:
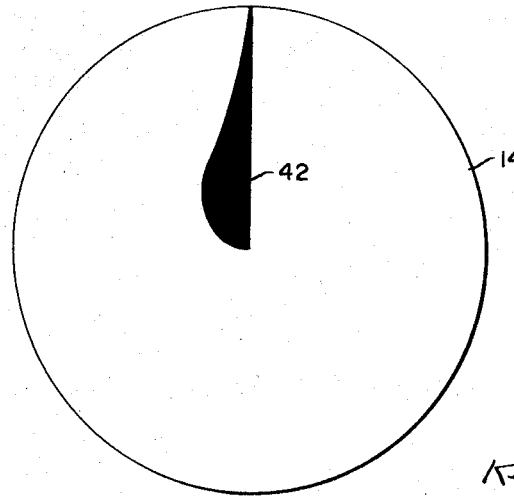
FIG. 4 is an illustration of a correcting or balancing element used in the invention.

In connection with the use of fiber optics, one of the difficulties that is encountered, insofar as uniformity of transmitted light is concerned, is that angular rays striking face 24 will not illuminate the pupil of objective lens 41 in uniformity with paraxial rays. Also, the radial distribution of energy in the final image plane of the system is a function of the angular distribution of energy of the source 6 which, as indicated above, is not uniform. Both kinds of nonuniformity, therefore, should be corrected, and for this purpose a corrective or balancing element 14 is provided as shown in FIG. 4. The element is an optical flat of a sufficient diameter, and a portion 42 thereof is rendered opaque with an opaque material either by painting or by some other means of deposition thereof. The necessary shape of the opaque portion can be approximated by conventional mathematics, or can be more conveniently determined empirically. In practice, the shape indicated will provide a degree of correction which will be found useful. Basically, the element 14 provides a subtractive function in which light is subtracted from the system (prior to final projection) so that if it is necessary, as to the image field at an elemental zone at radius $r_i$ to subtract light energy to make the illumination at this zone $r_i$ equal to the illumination at all other zones, the opaque figure 42 subtracts from the incident light at a radius $r_0$ an amount which is proportional (depending on the reduction factor of the system) to $r_i$, the correct amount of light then falling on the entrance pupil of the objective lens 41. Changes in the shape indicated can be made as dictated by the optical system in its entirety, including the fiber optics bundle 26 and the vignetting of the objective lens 41.

Having now described and illustrated a preferred embodiment of the invention, what I claim as new and on which I desire a United States Letters Patent is:

1. Apparatus for producing a uniform light field for use in exposing high-contrast, high-resolution photosensitive materials, comprising:
   a light source;
   a first lens for collimating light rays, said lens being corrected for spherical aberration;
   a second lens for focusing said collimated rays upon a target;
   a bundle of elongated, optically transparent fibers terminating in an optical entrance face at one end of the bundle, said face comprising said target, and terminating in an optical exit face at the other end of the bundle;
   the ends of the fibers at the entrance face being disposed in a first array having a shape whose envelope circumscribes the image of the light source;
   the ends of the fibers at the exit face being disposed in a circular array in which the fibers of any group of fibers lying in any given area of the entrance face are randomly dispersed throughout the area of the exit face, whereby the distribution of light in said circular array is substantially uniform, the area of said circular array being approximately equal to the area of said first array; and
   a lens system for focusing an image of said circular array upon a plane disposed at a predetermined location.

2. The device of claim 1 including a balancing element between said light source and said entrance face, the element comprising a transparent medium a portion of whose surface is provided with an opaque portion to bar the passage of light through the element, the opaque portion having a configuration adapted to attenuate, as a function of the radius of the element, that portion of light energy required to be subtracted from the image field at the radius thereof proportional to said radius of the element to obtain uniformity of illumination of the image field.

3. The device of claim 1 in which the fibers of said entrance face are stacked in a rectangular array, the fibers at said exit face are stacked in a circular array, and the envelope of said rectangular array geometrically approximately circumscribes the image of said light source falling thereon.

4. The device of claim 3 including a light filter between said first and second lenses for transmitting from the light of said source only light of a frequency to which the photosensitive material is relatively highly sensitive.

5. A projector for microreduction photographic apparatus employing a photosensitive material responsive to a predetermined range of wavelengths, comprising an arc discharge source of light, a collimating lens system disposed adjacent said source, a filter disposed in the path of collimated rays leaving said lens system and serving to pass light only at wavelengths within the range to which the photosensitive material is responsive, a focusing lens system for focusing the filtered and collimated rays at a predetermined plane, a bundle of optically transparent fibers having a planar entrance face disposed in said plane, the fibers at said entrance face being arranged approximately to match the configuration of the image of the light source focused upon said plane, said bundle having an exit face in which the fibers are arrayed in circular formation, the group of fibers in any given area of the entrance face being randomly dispersed throughout the total area of the circular exit face, a projection lens, and a condenser lens system disposed to direct rays emitted from the exit face of the bundle uniformly upon the entrance pupil of said projection lens.

6. A projector for microreduction photographic apparatus employing a photosensitive material responsive to a predetermined range of wavelengths, comprising an arc discharge source of light, a collimating lens system disposed adjacent said source, a filter disposed in the path of collimated rays leaving said lens system and serving to pass light only at wavelengths within the range to which the photosensitive material is responsive, a focusing lens system for focusing the filtered and collimated rays at a predetermined plane, a bundle of optically transparent fibers having a planar entrance face disposed in said plane, the fibers at said entrance face being arrayed in a rectangle whose length and width approximate the dimensions of the arc discharge, said bundle having an exit face in which the fibers are arrayed in circular formation, the group of fibers in any given area of the entrance face being randomly dispersed throughout the total area of the circular exit face, a projection lens, and a condenser lens system disposed to direct rays emitted from the exit face of the bundle uniformly upon the entrance pupil of said projection lens.